Aug. 28, 1951 S. L. CROWELL ET AL 2,565,477
FLUXED SOLDER ROD
Filed April 10, 1948
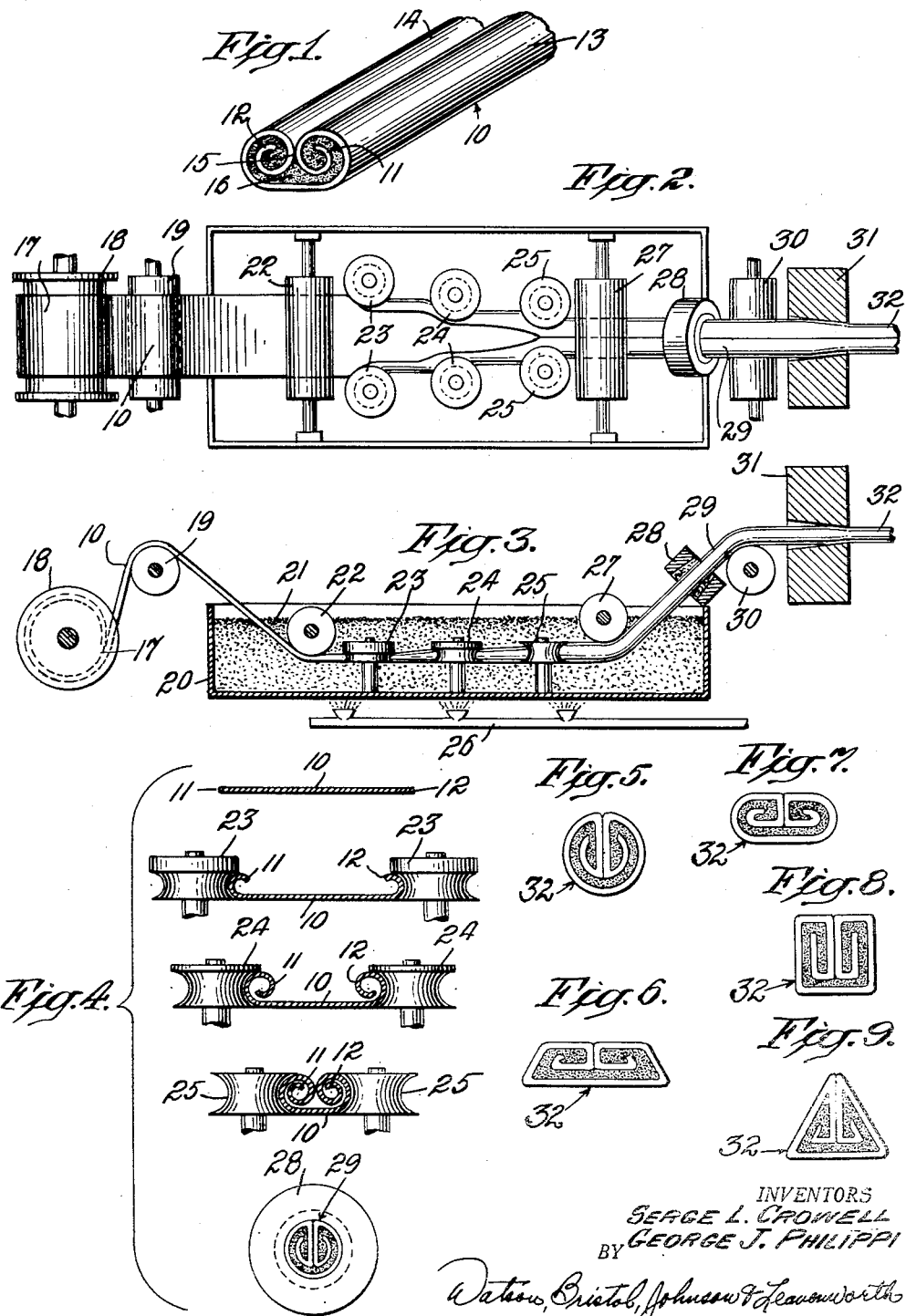
INVENTORS
SERGE L. CROWELL
GEORGE J. PHILIPPI
BY
ATTORNEYS Patented Aug. 28, 1951

2,565,477

UNITED STATES PATENT OFFICE 2,565,477

FLUXED SOLDER ROD

Serge L. Crowell, Garden City, and George J. Philippi, Brooklyn, N. Y., assignors to Dynoflow Solder Corporation, Long Island, N. Y., a corporation of New York Application April 10, 1948, Serial No. 20,294

2 Claims. (Cl. 113—110)

The present invention relates to solder which is marketed ready for use in the form of a rod, such as a stick or wire, carrying per unit length an amount of flux which should assure formation of proper joints with practice of usual soldering procedures.

Prior to the present invention many proposals have been made to so construct such a solder rod as to assure at every repetition of soldering action sufficient flux at the work. Solder wire of the tube type with the core void filled with or carrying flux is satisfactory for efficient formation of a joint on first use. However, the applied heat raises the temperature of the tube of solder material above the melting point of the flux an appreciable distance from the end of the wire at the work. The melted flux runs out and, as a result, an appreciable length of the wire at the end has insufficient flux to assure formation of a secure joint at the next soldering operation. Periodic crimping of the hollow tube to prevent escape of melted flux from beyond crimped points and other means have been resorted to in an effort to overcome such and other difficulties.

A general object of the present invention is to provide a fluxed solder rod, such as a stick or wire, which is characterized by longitudinally-extending voids or spaces of such dimensions and surfaces of such areas as to assure retention, by capillary action and/or adhesion, of flux in liquid state in an amount sufficient for efficient formation at every operation of proper soldered joints, while assuring during production of clean wire externally substantially free of flux having at least the required minimum amount of flux per unit length entrapped in the interior.

A more specific object of the invention is to provide such fluxed solder rod characterized by a relatively thin strip of solder having its edges curled up in opposite directions about substantially parallel, longitudinal axes and with turns thereof meeting to provide a longitudinal seam which retains interiorly disposed flux material that may, in a preferred form, intervene successive turns of two parallel rolls formed by the curled edges.

Another object of the present invention is to provide such a double roll solder rod in which layers or films of flux material intervene adjacent surfaces of successive, closely arranged turns of each roll and of the two rolls inwardly of a sealing seam formed by contact of the inner sides of the two rolls whereby capillary action and/or adhesion assures effective retention of flux substantially to the end of the rod despite melting due to application of heat in the formation of a solder joint.

Other objects of the invention will in part be obvious and will in part appear hereinafter.

The invention accordingly comprises the features of construction, combination of elements and arrangement of parts, which will be exemplified in the construction hereinafter set forth, and the scope of the invention will be indicated in the claims.

For a fuller understanding of the nature and objects of the invention, reference should be had to the following detailed description taken in connection with the accompanying drawing, in which:

Fig. 1 is an enlarged perspective view of a section of a preferred intermediate form of fluxed solder rod of the present invention, as prepared for final drawing down into finished wire form, with dimensions exaggerated for clarity;

Fig. 2 is a top plan view of equipment suitable for making solder rod of the present invention and indicating the progressive formation thereof;

Fig. 3 is a longitudinal elevational section of the structure shown in Fig. 2;

Fig. 4 is a lay-out of transverse sections of the strip of solder material showing its progressive shaping at various stages in the formation of the fluxed solder rod as accomplished by operation of the equipment shown in Figs. 2 and 3, and with vital parts of the equipment shown associated therewith; and Figs. 5, 6, 7, 8 and 9 are respectively cross-sectional views of a number of modified forms of the fluxed solder rod of the present invention indicating possible variations in the cross-sectional shape thereof, all in accordance with the present invention.

In the drawing, like numerals identify similar parts throughout, and, as will be seen from Fig. 1, an embodiment of the fluxed solder rod of the present invention may take the form of an elongated strip 10 of relatively thin solder material sheeting having its two longitudinally-extending side edges 11 and 12 curled inwardly toward each other in opposite directions about substantially parallel, longitudinally-extending axes to form two parallel, longitudinally-arranged rolls 13 and 14, each preferably of spiral formation. Those two rolls 13 and 14 are brought to contact at 15 in a substantially leak-proof manner to provide a seam extending substantially centrally of the rod; e. e., medially of its two sides. That contact seam prevents undue leakage or squeeze-out of fluid flux material from the interior of the rod inwardly of the seam, during production and drawing down and also in service. It will be understood that in Fig. 1 the dimensions are exaggerated for clarity, and that actually the opposed surfaces of successive turns of each of the two rolls 1, 3 and 14 are intended in commerical embodiments to be located closely adjacent. Intervening the closely arranged surfaces of the successive turns of each of rolls 13 and 14 and those two rolls, the spaces are filled by films of fluid flux material 16, which may be in either substantially liquid or paste form and of suitable composition, such as that known as "rosin" flux.

As shown in Figs. 2, 3 and 4, an embodiment of the fluxed solder rod of the present invention may be made by drawing the strip 10 of solder material in substantially flat form from a roll 17 thereof on a supply spool 18 down over a guide roller 19 into a container 20 having a fluid body or bath 21 of flux material therein and to beneath a submerged guide roller 22. There is submerged in the bath 21 a plurality of sets of curling rollers which, as indicated in Figs. 2, 3 and 4, may comprise three sets 23, 23; 24, 24; and 25, 25. As indicated in Figs. 2 and 4, the edges 11 and 12 of the strip 10 of solder material are progressively curled or rolled up back upon themselves toward the center of the strip during complete submergence in the bath of flux material so as eventually to form the two adjacent longitudinal rolls 13 and 14 which are brought substantially to central contact at 15 to form the longitudinally-extending substantially leak-proof seam for retention of the flux material 16 trapped within the interior. When flux material that is pasty in form when cool is employed, a suitable heat source 26 may be associated with the tank 20 to keep therein the bath 21 of flux material in liquid state for efficient coating of the surfaces of the strip 10 of solder material during the formation of the rolls 13 and 14.

The resulting double roll structure, which may be in a form similar to that indicated in Fig. 1, is then drawn from beneath a second submerged guide roller 27 and thence out of the bath preferably to a suitable shaping and/or wiping device 28, at least to remove excess flux material from external surfaces of the fluxed solder rod and, preferably, to shape it in section. The shaping and wiping device at 28 may, as best shown in Fig. 4, take the form of a circular die which will also shape the double roll solder rod substantially to circular form as indicated at 29 in Fig. 4. The circular fluxed solder rod 29 may then be drawn over a fourth guide roller 30 to and through a tapered-throated reducing die 31 and a series of the latter may be, if desired, employed to draw the fluxed solder rod down to a wire 32 of any desired diameter.

Shaping die 28 and/or one or more such drawing dies 31 may have formed therein holes of any desired cross-sectional shape to produce a variety of shapes of the finished fluxed solder rod 32 of the present invention, a number of such possible cross-sectional shapes being indicated in Figs. 5 to 9 inclusive.

It is to be understood that in order to assure somewhat uniform transverse distribution of the flux composition in the fluxed solder rod product with the flux present in an amount in a preferred range of about three to ten per cent (3-10%) by weight the curling of the edges of the solder strip 10 must be accomplished in such a way as to assure a proper spacing between successive turns so that layers of flux of certain thicknesses can be entrapped in properly distributed manner therein. For example, in producing the product in the form of Fig. 5 from the intermediate form of Fig. 1, from a solder strip about three quarters to one inch (¾-1") wide and about fourteen to fifteen thousandths of an inch (0.014-0.015") thick, the curling will be done in such manner as to assure a spacing between surfaces of successive turns of about six to seven thousandths of an inch (0.006-0.007") so as to assure a thickness of the flux layer of similar dimensions. This is accomplished by the proper selections of curvatures of the faces of the pairs of curling rollers 23, 23; 24, 24 and 25, 25. As shown in Fig. 4 the rolls 13 and 14 will be curled up with substantially uniform spacing of surfaces of successive turns.

With the employment of such equipment, the fluxed solder rod product of the present invention may be rapidly and continuously formed in a simple and efficient manner with draft on the finished rod as it emerges from the reducing die equipment at 31. External surfaces of the product are relatively free from flux material due to wiping action of the wiping device at 28 and that of the reducing die equipment. Flux material is efficiently entrapped within the interior in the nature of films thereof intervening closely adjacent surfaces.

Of course, it will be understood that the apparatus may be modified in any suitable or desired manner so long as it performs the successive steps of making the fluxed solder rod product of the present invention, and that, if desired, a fewer or greater number of turns or coils may be provided in each of the two rolls 13 and 14. Additionally, after formation of the product in any of the forms illustrated in the drawing, it may be further drawn down by suitable drawing dies to any desired cross-sectional dimension, and the flux material may be employed either in liquid or paste form. In paste form, the internal spaces efficiently retain an amount of the flux material per unit length of the solder rod at least equal to the necessary minimum quantity for efficient successive formation of soldered joints. Further, the flux material may, if desired, be provided in liquid form, since, inwardly of seam 15, the extended areas of the solder strip 10 and the successive turns of the rolls 13 and 14 thereof are of such extent, and the intervening spaces are narrow enough to serve as capillary spaces, as to assure retention of an amount of such liquid flux per unit length of solder rod which is at least equal to the necessary minimum quantity by virtue of capillary action and/or adhesion.

It has been found in use of the fluxed solder rod of the present invention that at all times there is retained within the solder rod up to the extreme end thereof a sufficient quantity of flux to assure efficient formation of soldered joints. The heat applied to the solder rod during the previous formation of a soldered joint does not bleed out of the end of the solder rod the flux material in such quantity as to prevent efficient formation of the next soldered joint. Various embodiments of the product of the present invention have been found efficiently to assure attainment of the objects set forth above, and those made apparent from the preceding description.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A fluxed solder rod comprising an elongated strip of solder material sheeting having its longitudinal edges curled inwardly toward each other in opposite directions about substantially parallel longitudinally-extending axes to provide a pair of adjacent longitudinally-extending curled rolls with the edge in each turned at least through more than 360° and the opposed portions of the turns in each roll lying closely adjacent each other to provide a spiralled intervening space of substantially uniform width of an order which will accommodate only relatively thin films of flux material, the resulting longitudinally-extending opposed surface areas of the outermost turns of said rolls being in contact to provide a longitudinal seam, and relatively thin films of flux material of approximately uniform thickness substantially filling the intervening spiralled spaces interiorly of the seam and in an amount per unit length of rod at least equal to the necessary minimum quantity, said flux films being of such thickness as to be retained by inherent capillarity in said spaces when in a liquid state with no material bleeding thereof out of the open ends of said spaces at the end of the rod under soldering heat.

2. The fluxed solder rod as defined in claim 1 characterized by said films being of a thickness of the order of 0.006 to 0.007 of an inch.

SERGE L. CROWELL.
GEORGE J. PHILIPPI.

REFERENCES CITED

The following references are of record in the file of this patent:

UNITED STATES PATENTS

| Number | Name | Date |
|---|---|---|
| 400,869 | Norton | Apr. 2, 1889 |
| 1,272,000 | Blackmore | July 9, 1918 |
| 1,531,828 | Armor | Mar. 31, 1925 |
| 1,629,748 | Stoody | May 24, 1927 |
| 1,653,456 | Campbell | Dec. 20, 1927 |
| 1,698,360 | Day | Jan. 8, 1929 |
| 2,350,387 | Cito | June 6, 1944 |

FOREIGN PATENTS

| Number | Country | Date |
|---|---|---|
| 433,194 | Great Britain | Aug. 9, 1935 |
| 525,583 | Great Britain | Aug. 30, 1940 |
| 370,870 | France | Feb. 21, 1907 |
| 65,107 | Norway | Aug. 3, 1942 |